March 13, 1951     J. M. BARTHOLOMEW     2,544,821
COMPRESSOR SUPERCHARGING SYSTEM
Filed Sept. 7, 1945
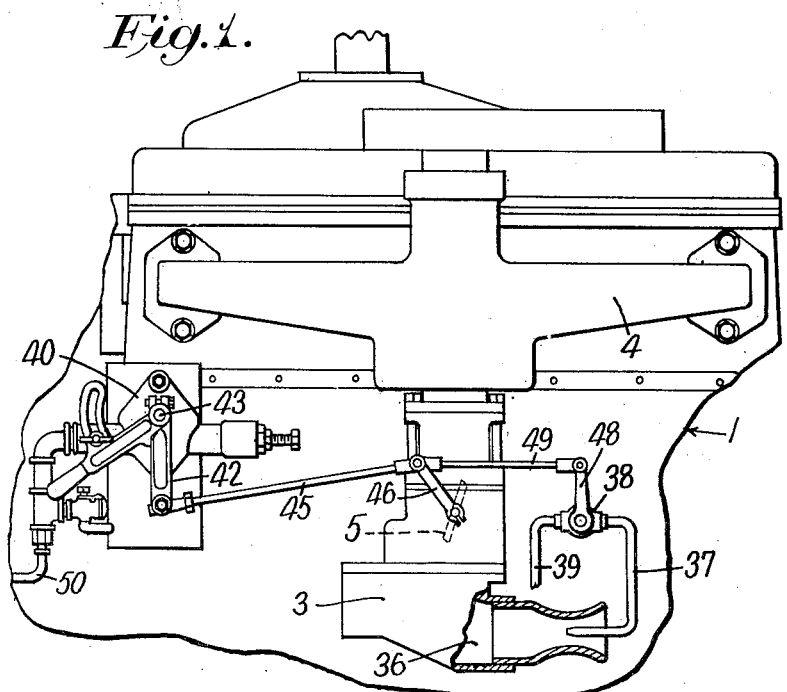
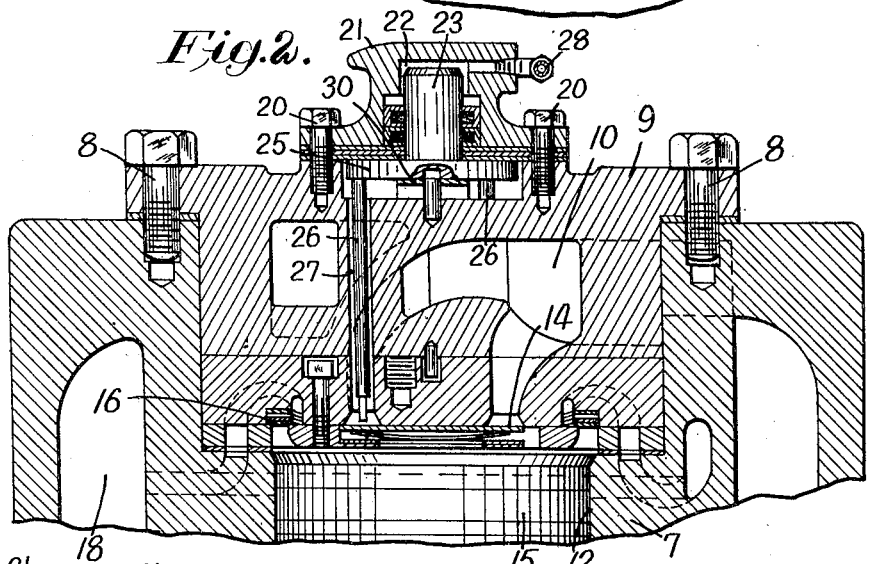
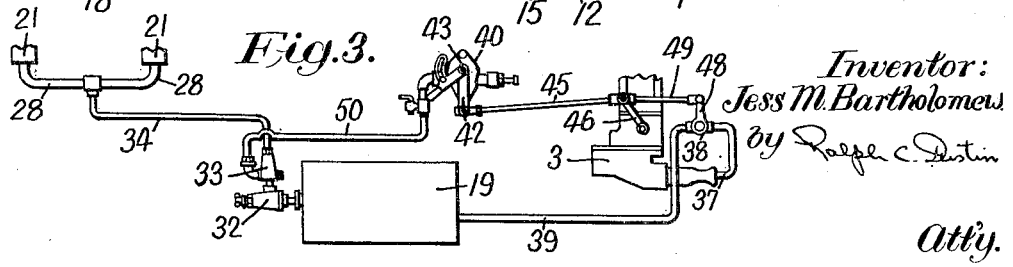
Inventor:
Jess M. Bartholomew
By Ralph C. Destin
Atty.

Patented Mar. 13, 1951

2,544,821

UNITED STATES PATENT OFFICE 2,544,821

COMPRESSOR SUPERCHARGING SYSTEM

Jess M. Bartholomew, Michigan City, Ind., assignor to Joy Manufacturing Company, a corporation of Pennsylvania Application September 7, 1945, Serial No. 614,973

11 Claims. (Cl. 230—4)

My invention relates to superchargers for internal combustion engines, and more particularly to superchargers for engines which are connected to drive compressors.

Internal combustion engines are frequently provided with means supplying an explosive mixture to their cylinders under pressure in order that they may be caused to operate more efficiently and with increased power. It is especially desirable that some supercharging means be provided while an engine is operating at high elevations and is carrying heavy loads.

My invention contemplates the supercharging of an engine driving a compressor by providing means which supplies to the carburetor of the engine air which has been compressed by the compressor. The compressor is provided with an unloading means which operates at a predetermined discharge pressure of the compressor for effecting its unloading. The load on the engine while the compressor is being driven unloaded is sufficiently low so that a supercharging of the engine during this time is not necessary and, since it is desirable to conserve as far as possible the compressed air, the supply of compressed air to the engine is cut off while the compressor is operated unloaded.

An object of my invention is to provide improved supercharging means for an engine driving a compressor. Another object is to provide for an engine driving a compressor an improved means for supplying air compressed by the compressor to the carburetor of the engine. Still another object is to provide an improved means for supplying air under pressure to an engine for supercharging the latter when its load is heavy and operating to cut off the supply of such air when the load is light. Yet another object is to provide for an engine driving a compressor improved means for supplying air compressed by the compressor to the engine when the compressor is being driven loaded and operating automatically to cut off the supply of such air when the compressor is driven unloaded. Other objects of my invention will appear in the course of the following description.

In the accompanying drawings there is shown for purposes of illustration one form which my invention may assume in practice.

In these drawings:

Fig. 1 is a side elevational view of an engine having my improved supercharging means associated therewith.

Fig. 2 is a central sectional view of a cylinder head and a portion of a cylinder of a compressor connected in driven relation with the engine of Fig. 1.

Fig. 3 is a schematic diagram showing the fluid supply system for the compressor unloading means and the engine supercharger.

In the illustrative embodiment of the invention, there is shown an internal combustion engine 1 having operating fluid supplied from a carburetor 3 to its intake manifold 4 under the control of a throttle valve 5. The power shaft of the engine is connected by means, not shown, in driving relation with a compressor, a portion of one of the compressor cylinders being shown at 7. Attached to the cylinder 7, as by screws 8, is a cylinder head 9 having an intake passage 10 through which fluid is conducted to a bore 12 in the cylinder past an inlet valve 14 during the suction stroke of a compressor piston 15. Fluid is discharged during the compression stroke of the piston from the cylinder bore past a discharge valve 16 to a passage 18 which conducts it to a receiver 19 shown in Fig. 3. Connected to the cylinder head, as by screws 20, is a member 21 having a chamber 22 into which a plunger 23 projects. A flange portion 25 on the plunger has rods 26 connected thereto, the rods extending through openings 27 in the cylinder head and acting on the inlet valve 14 to unseat the latter and effect an unloading of the compressor when pressure fluid is supplied through a conduit 28 to the chamber 22. A spring 30 acts on the plunger 23 to hold the latter normally in such a position that the rods 26 are free of the inlet valve.

The compressor, as indicated by portions of the members 21 in Fig. 3, has in this case two cylinders, but it will be understood that a compressor having a different number of cylinders may be employed, if desired. Pressure fluid is supplied from the receiver 19 under the control of a pilot valve 32 to a device 33 which is connected by a conduit 34 in communication with the conduits 28 leading to the chambers 22 in the members 21. The pilot valve operates at a predetermined maximum pressure to connect the receiver in communication with the device 33, and operates at a somewhat lower pressure to vent the device 33 to atmosphere. The device 33 permits fluid to flow freely toward the unloading devices and restricts the flow in the opposite direction.

Opening into a chamber 36 in the carburetor, as shown in Fig. 1, is a conduit 37 which is connected under control of a valve 38 in communication with a conduit 39 opening into the receiver 19. A fluid actuated device 40, connected by any suitable means to the side of the engine, is provided with an arm 42 which swings in a counter-clockwise direction about a pivot point 43 when pressure fluid is supplied to the device. A rod 45 connects the free end of the arm 42 to an arm 46 operatively connected to the throttle valve 5. The valve 38 is provided with an arm 48 which is connected by a rod 49 to the arm 46 of the throttle valve. The device 40 operates when fluid is vented therefrom to swing the arm 42 in a clockwise direction and move the valves 5 and 38 to their open positions. When pressure fluid is supplied to the device 40, the arm 42 swings in a direction to close the valves 5 and 38. A conduit 50 connects the device 40 to the device 33 at a point communicating freely with the pilot valve 32.

It will be seen that an increase in the receiver pressure to the maximum value for which the pilot valve is adjusted will result in an operation of the pilot valve to supply fluid from the receiver through the device 33 and the conduits 34 and 28 to the unloading means for the compressor cylinders. The fluid will flow freely through the device 33 and effect an immediate unloading of the compressor. At the same time a free flow of fluid will pass through the conduit 50 to the device 40 and operate the latter to move the valves 5 and 28 to their closed positions. The closing of the valve 5 will result in a slowing down of the engine to an idling speed, and the closing of the valve 38 will cut off the flow of compressed air to the carburetor so that the engine will operate without supercharging. When the receiver pressure drops to a predetermined lower value, the pilot valve 32 operates to vent the unloading means and the device 40 to atmosphere. The fluid escapes freely from the device 40 through the conduit 50 and causes the valves 5 and 38 to be opened for speeding up the engine and causing a supercharging of the latter to take place. The flow of fluid from the unloading means is restricted by the device 33 so that reloading of the compressor does not take place until the engine has been brought up to speed.

As a result of my invention there is provided improved means for supercharging an engine driving a compressor by supplying fluid compressed by the compressor to the engine. The supply of fluid for supercharging is cut off automatically when the compressor is unloaded so that the supply of compressed fluid is conserved.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. In combination, a compressor, an internal combustion engine for driving said compressor, fluid actuated unloading means for said compressor, a receiver for fluid compressed by said compressor, means for conducting fluid from said receiver to said engine for supercharging the latter, valve means for controlling the flow of fluid through said fluid conducting means, fluid actuated means for controlling said valve means, and means responsive to receiver pressure operative at a predetermined maximum pressure in said receiver for supplying fluid to said unloading means and to said fluid actuated controlling means.

2. In combination, a compressor, an internal combustion engine for driving said compressor, fluid actuated unloading means for said compressor, a receiver for fluid compressed by said compressor, means for conducting fluid from said receiver to said engine for supercharging the latter, valve means for controlling the flow of fluid through said fluid conducting means, fluid actuated means for controlling said valve means, said last mentioned means operative on the supply of fluid thereto for closing said valve means, and means responsive to receiver pressure operative at a predetermined maximum pressure in said receiver for supplying fluid to said unloading means and to said fluid actuated controlling means.

3. In combination, a compressor, an internal combustion engine for driving said compressor, fluid actuated unloading means for said compressor, a receiver for fluid compressed by said compressor, means for conducting fluid from said receiver to said engine for supercharging the latter, valve means for controlling the flow of fluid through said fluid conducting means, a throttle valve for controlling the supply of operating fluid to said engine, fluid actuated means for controlling said valve means and said throttle valve, and means responsive to receiver pressure operative at a predetermined maximum pressure in said receiver for supplying fluid to said unloading means and to said fluid actuated controlling means.

4. In combination, a compressor, an internal combustion engine for driving said compressor, fluid actuated unloading means for said compressor, a receiver for fluid compressed by said compressor, means for conducting fluid from said receiver to said engine for supercharging the latter, valve means for controlling the flow of fluid through said fluid conducting means, a throttle valve for controlling the supply of operating fluid to said engine, fluid actuated means for controlling said valve means and said throttle valve, said last mentioned means operative on the supply of fluid thereto for closing said valve means and said throttle valve, and means responsive to receiver pressure operative at a predetermined maximum pressure in said receiver for supplying fluid to said unloading means and to said fluid actuated controlling means.

5. In combination, a compressor, an internal combustion engine for driving said compressor, unloading means operative on the supply of pressure fluid thereto for unloading said compressor, a receiver for fluid compressed by said compressor, means for conducting fluid from said receiver to said engine for supercharging the latter, valve means for controlling the flow of fluid through said fluid conducting means, a throttle valve for controlling the supply of operating fluid to said engine, fluid actuated means for controlling said valve means and said throttle valve, and means including a pilot valve responsive to the pressures in said receiver for connecting said unloading means and said fluid actuated means to said receiver or to atmosphere.

6. In combination, a compressor, an internal combustion engine for driving said compressor, unloading means operative on the supply of pressure fluid thereto for unloading said compressor, a receiver for fluid compressed by said compressor, means for conducting fluid from said receiver to said engine for supercharging the latter, valve means for controlling the flow of fluid through said fluid conducting means, a throttle valve for controlling the supply of operating fluid to said engine, fluid actuated means for controlling said valve means and said throttle valve, said last mentioned means operating on the supply of fluid thereto for moving said valve means and said throttle valve toward their closed positions, and means including a pilot valve operating at a predetermined maximum pressure in said receiver for connecting said unloading means and said fluid actuated means in communication with said receiver and operating at a predetermined lower pressure for connecting said unloading means and said fluid actuated means in communication with atmosphere.

7. In combination, a compressor, an internal combustion engine for driving said compressor, means for unloading said compressor, means for controlling the speed of said engine, means for supercharging said engine, and means governed by compressor discharge pressure for controlling said unloading, speed controlling and supercharging means for automatically effecting a slowing down of said engine to an idling speed when said compressor is unloaded and for automatically interrupting the supercharging of said engine when the latter is slowed down to an idling speed.

8. In combination, a pump, an internal combustion engine for driving said pump, means for unloading said pump, means for controlling the speed of said engine, means for supercharging said engine, and means for controlling said unloading, speed controlling and supercharging means for effecting operation of said engine unsupercharged at an idling speed while said compressor is driven unloaded, and including means for automatically controlling said supercharging means to effect supercharging of said engine when the latter drives the pump loaded.

9. In combination, a pump, an internal combustion engine for driving said pump, means for unloading said pump, means for controlling the speed of said engine, means for supercharging said engine, means for controlling said unloading and speed controlling means operative to coordinate the operation thereof so that said speed controlling means slows down said engine when said pump is unloaded and is operated to speed up said engine upon loading of said pump, means for controlling said engine supercharging means, and means for operatively connecting said engine supercharging means controlling means with said speed controlling means to effect supercharging whenever the engine is speeded up.

10. In combination, a pump, an internal combustion engine for driving said pump, means for unloading said pump, means for controlling the speed of said engine, means for supercharging said engine, means for controlling said unloading and speed controlling means operative to coordinate the operation thereof so that said speed controlling means slows down said engine when said pump is unloaded and is operated to speed up said engine upon loading of said pump, means for controlling said engine supercharging means, and means for automatically actuating said last mentioned controlling means to cause said engine to be supercharged whenever said pump is loaded.

11. In combination, a compressor, an internal combustion engine for driving said compressor, fluid actuated unloading means for said compressor, means for supercharging said engine, fluid actuated means for controlling the operation of said supercharging means operative on fluid supply thereto to interrupt engine supercharging, and means responsive to compressor discharge pressure operative at a predetermined maximum pressure for supplying fluid to said unloading means and to said fluid actuated means for controlling the operation of said supercharging means.

JESS M. BARTHOLOMEW.

REFERENCES CITED

The following references are of record in the file of this patent:

UNITED STATES PATENTS

| Number | Name | Date |
| --- | --- | --- |
| 1,692,266 | Holdsworth | Nov. 20, 1928 |
| 1,834,601 | Clapp | Dec. 1, 1931 |
| 1,998,265 | Aikman | Apr. 16, 1935 |
| 2,135,248 | Aikman | Nov. 1, 1938 |
| 2,403,398 | Reggio | July 2, 1946 |